(12) United States Patent
Kim et al.

(10) Patent No.: US 12,251,987 B2
(45) Date of Patent: Mar. 18, 2025

(54) HEAT PUMP SYSTEM FOR VEHICLE

(71) Applicants: Hyundai Motor Company, Seoul (KR); Kia Corporation, Seoul (KR)

(72) Inventors: Myunghwan Kim, Suwon-si (KR); Jai Young An, Suwon-si (KR); Namho Park, Suwon-si (KR); Wan Je Cho, Hwaseong-si (KR); Eon Soo Yun, Hwaseong-si (KR); Seong-Bin Jeong, Hwaseong-si (KR); Yeonho Kim, Seoul (KR); Seongjae Lee, Suncheon-si (KR); Jae Yeon Kim, Hwaseong-si (KR); Myung Hyuk Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 377 days.

(21) Appl. No.: 17/951,269

(22) Filed: Sep. 23, 2022

(65) Prior Publication Data

US 2023/0356566 A1    Nov. 9, 2023

(30) Foreign Application Priority Data

May 9, 2022    (KR) .................. 10-2022-0056385

(51) Int. Cl.
*B60H 1/32*    (2006.01)
*B60H 1/00*    (2006.01)

(52) U.S. Cl.
CPC ....... *B60H 1/3213* (2013.01); *B60H 1/00007* (2013.01)

(58) Field of Classification Search
CPC .................. B60H 1/3213; B60H 1/00007
See application file for complete search history.

(56) References Cited

U.S. PATENT DOCUMENTS 9,638,480 B1 * 5/2017 Maranville ............. F28D 15/00
2019/0168569 A1 * 6/2019 Lee ........................ B60L 58/26

FOREIGN PATENT DOCUMENTS

CN       109297208 A   *   2/2019

OTHER PUBLICATIONS

Zhang et al., Gas Replenishing Enthalpy-Increasing Electric Vehicle . . . , Feb. 1, 2019, CN109297208A, Whole Document (Year: 2019).*

* cited by examiner

*Primary Examiner* — Larry L Furdge
(74) *Attorney, Agent, or Firm* — Slater Matsil, LLP (57) ABSTRACT

An embodiment heat pump system for a vehicle includes a first cooling apparatus that circulates a first coolant in a first coolant line to control a temperature of an electrical component, a second cooling apparatus that circulates a second coolant in a second coolant line to control a temperature of a battery module, a third cooling apparatus that circulates a third coolant in a third coolant line to control a temperature of an autonomous driving controller, and an air conditioning device that circulates a refrigerant along a first refrigerant line to control an indoor temperature of the vehicle, the air conditioning device including a compressor, a condenser, a first expansion valve, and an evaporator all connected through the first refrigerant line, and further including a first chiller, a second chiller, and a connection line.

20 Claims, 5 Drawing Sheets

HEAT PUMP SYSTEM FOR VEHICLE

CROSS-REFERENCE TO RELATED APPLICATIONS

This application claims the benefit of Korean Patent Application No. 10-2022-0056385, filed on May 9, 2022, which application is hereby incorporated herein by reference.

TECHNICAL FIELD

The present invention relates to a heat pump system for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmental-friendly vehicle capable of substantially substituting for an internal combustion engine vehicle is required, and the environmental-friendly vehicle is classified into an electric vehicle driven using a fuel cell or electricity as a power source and a hybrid vehicle driven using an engine and a battery.

Among these environment-friendly vehicles, an air conditioner system applied to the electric vehicle or the hybrid vehicle is generally referred to as a heat pump system.

On the other hand, recently, there has been a demand for development of a vehicle capable of autonomous driving, and a radar, a lidar, a global positioning system (GPS), etc., various sensors, and an autonomous driving controller controlling the same, which are required for the autonomous driving, are mounted on the vehicle.

However, in the vehicle capable of the autonomous driving, as a separate cooling device cooling an autonomous driving controller having a relatively large heat dissipation amount is required together with a cooling device cooling an engine or a motor, and the electrical components, a cooling device preventing heat dissipation of the battery module including a fuel cell, and an air conditioning system cooling or heating a room of the vehicle, there is a disadvantage in that cost increases, and it is difficult to secure a space for being equipped with the cooling system inside a narrow vehicle.

Further, there is also a disadvantage in that a size and a weight of a cooling module mounted on the vehicle increase, and a layout of connection pipes for supplying the refrigerant or the coolant to the cooling device, the air conditioning device, and the autonomous driving controller cooling device in a narrow space is complicated.

In addition, the conventional heat pump system is not capable of independently cooling the autonomous driving controller during the vehicle heating mode operation, so there are drawbacks in that a separate heat-exchanger or high voltage heater is added, increasing manufacturing cost and increasing power consumption.

The above information disclosed in this background section is only for enhancement of understanding of the background of embodiments of the invention, and therefore it may contain information that does not form the prior art that is already known to a person of ordinary skill in the art.

SUMMARY

The present invention relates to a heat pump system for a vehicle. Particular embodiments relate to a heat pump system for a vehicle for selectively cooling an autonomous driving controller and simultaneously recovering waste heat of an autonomous driving controller in a heating mode inside a vehicle in a vehicle in which autonomous driving is available.

Therefore, embodiments of the present invention can solve problems in the art, and embodiments of the present invention provide a heat pump system for a vehicle for selectively cooling an autonomous driving controller and simultaneously recovering waste heat of an autonomous driving controller in a heating mode inside a vehicle in a vehicle in which autonomous driving is available.

A heat pump system for a vehicle according to an embodiment of the present invention includes a first cooling apparatus that circulates a first coolant in a first coolant line to control a temperature of an electrical component, a second cooling apparatus that circulates a second coolant in a second coolant line to control a temperature of a battery module, a third cooling apparatus that circulates a third coolant in a third coolant line to control a temperature of an autonomous driving controller, and an air conditioning device including a compressor, at least one condenser, a first expansion valve, and an evaporator, which are connected through a first refrigerant line, and circulating a refrigerant along the first refrigerant line to control the indoor temperature of the vehicle, wherein the air conditioning device includes a first chiller connected to the first refrigerant line through a second refrigerant line, connected to the second coolant line, and heat-exchanging the selectively inflowed second coolant with the refrigerant supplied through the second refrigerant line to control a temperature of the second coolant, a second chiller connected to the first refrigerant line through a third refrigerant line, connected to the third coolant line, and heat-exchanging the selectively inflowed third coolant with the refrigerant supplied through the third refrigerant line to control a temperature of the third coolant, and a connection line having one end connected to the first refrigerant line through the first valve and the other end connected to the third refrigerant line at the front end of the second chiller.

The connection line may be opened through the operation of the first valve when the cooling of the autonomous driving controller is required in the heating mode of the vehicle interior.

The first chiller may be coupled in parallel to the first refrigerant line through the second refrigerant line, the second chiller may be coupled in parallel to the first refrigerant line through the third refrigerant line, and the first chiller and the second chiller may be disposed in parallel with the evaporator through the second refrigerant line and the third refrigerant line, respectively.

The air conditioning device may further include a heat-exchanger connected to the first coolant line, and may heat-exchange the refrigerant supplied through the first refrigerant line and the first coolant supplied through the first coolant line to condense or evaporate the refrigerant.

At least one condenser may include an indoor condenser and an outdoor condenser, and the heat-exchanger may be provided on the first refrigerant line between the indoor condenser and the outdoor condenser.

The air conditioning device may further include a branched line having one end connected to a second valve provided on the first refrigerant line between the heat-exchanger and the outdoor condenser and the other end connected to the first refrigerant line between the evaporator and the compressor.

When the cooling of the autonomous driving controller is not required in the heating mode of the vehicle interior, the second valve may open the branched line and close the first refrigerant line connected to the outdoor condenser.

When the cooling of the autonomous driving controller is required in the heating mode of the vehicle interior, the first valve may open the connection line and close the first refrigerant line connected to the outdoor condenser, and the second valve may close the branched line and open the first refrigerant line connected to the first valve.

A second expansion valve may be provided on the second refrigerant line, a third expansion valve may be provided on the third refrigerant line, and a fourth expansion valve may be provided between the indoor condenser and the heat-exchanger.

The fourth expansion valve may expand the refrigerant supplied from the indoor condenser through the first refrigerant line in the heating mode of the vehicle interior to be supplied to the heat-exchanger.

The second, third, and fourth expansion valves may be electronic expansion valves that selectively expand the refrigerant while controlling the flow of refrigerant.

The electrical component may be provided on the first coolant line, the battery module may be provided on the second coolant line, and the autonomous driving controller may be provided on the third coolant line.

If the cooling of the autonomous driving controller is required in the heating mode of the vehicle interior, the second chiller may heat-exchange the supplied refrigerant and the third coolant to cool the third coolant and simultaneously recover waste heat of the autonomous driving controller from the refrigerant heat-exchanged with the third coolant.

As above-described, according to the heat pump system for a vehicle according to an embodiment of the present invention, by selectively cooling the autonomous driving controller in the vehicle capable of the autonomous driving even in the heating mode of the vehicle interior, and simultaneously recovering the waste heat of the autonomous driving controller, the temperature of the autonomous driving controller may be efficiently controlled and the heating efficiency may be improved.

In addition, embodiments of the present invention do not need to add a separate heat-exchanger for cooling the autonomous driving controller in the vehicle's heating mode, thereby reducing a manufacturing cost.

In addition, embodiments of the present invention may reduce the power consumption and increase the entire travel distance by minimization of the use of a high voltage electric heater in the heating mode of the vehicle.

In addition, embodiments of the present invention may improve the durability and performance of the autonomous driving controller by efficiently cooling the autonomous driving controller even in the heating mode of the vehicle.

Furthermore, embodiments of the present invention may improve the overall marketability of the vehicle and customer satisfaction.

The following reference identifiers may be used in connection with the accompanying drawings to describe exemplary embodiments of the present disclosure.

10, 110 first cooling apparatus
12, 112 first coolant line
14, 114 electrical component
20, 120 second cooling apparatus
22, 122 second coolant line
24, 124 battery module
30, 130 third cooling apparatus
32, 132 third coolant line
34, 134 autonomous driving controller
50, 150 air conditioning device
51, 151 first refrigerant line
52, 152 compressor
53, 153 condenser
54, 154 first expansion valve
55, 155 evaporator
56, 156 heat-exchanger
61, 161 first chiller
62, 162 second refrigerant line
63, 163 second expansion valve
64, 164 second chiller
65, 165 third refrigerant line
66, 166 third expansion valve
67, 167 fourth expansion valve
68, 168 connection line
69 branched line
V1, V2 first, second valve

DETAILED DESCRIPTION OF ILLUSTRATIVE EMBODIMENTS

Embodiments of the present invention will hereinafter be described in detail with reference to the accompanying drawings.

Prior to this, configurations illustrated in the exemplary embodiments and drawings disclosed in the present specification are only the most preferred embodiments of the present invention and do not represent all of the technical spirit of the present invention, and thus it is to be understood that various equivalents and modified examples, which may replace the configurations, are possible when filing the present application.

The drawings and description are to be regarded as illustrative in nature and not restrictive, and like reference numerals designate like elements throughout the specification.

Since size and thickness of each component illustrated in the drawings are arbitrarily represented for convenience in explanation, the present invention is not particularly limited to the illustrated size and thickness of each component and the thickness is enlarged and illustrated in order to clearly express various parts and areas.

In addition, throughout the specification, unless explicitly described to the contrary, the word "comprise", and variations such as "comprises" or "comprising", will be understood to imply the inclusion of stated elements but not the exclusion of any other elements.

In addition, the terms "unit", "means", "part", and "member", which are described in the specification, mean a unit of a comprehensive configuration that performs at least one function or operation.

Figure 1:
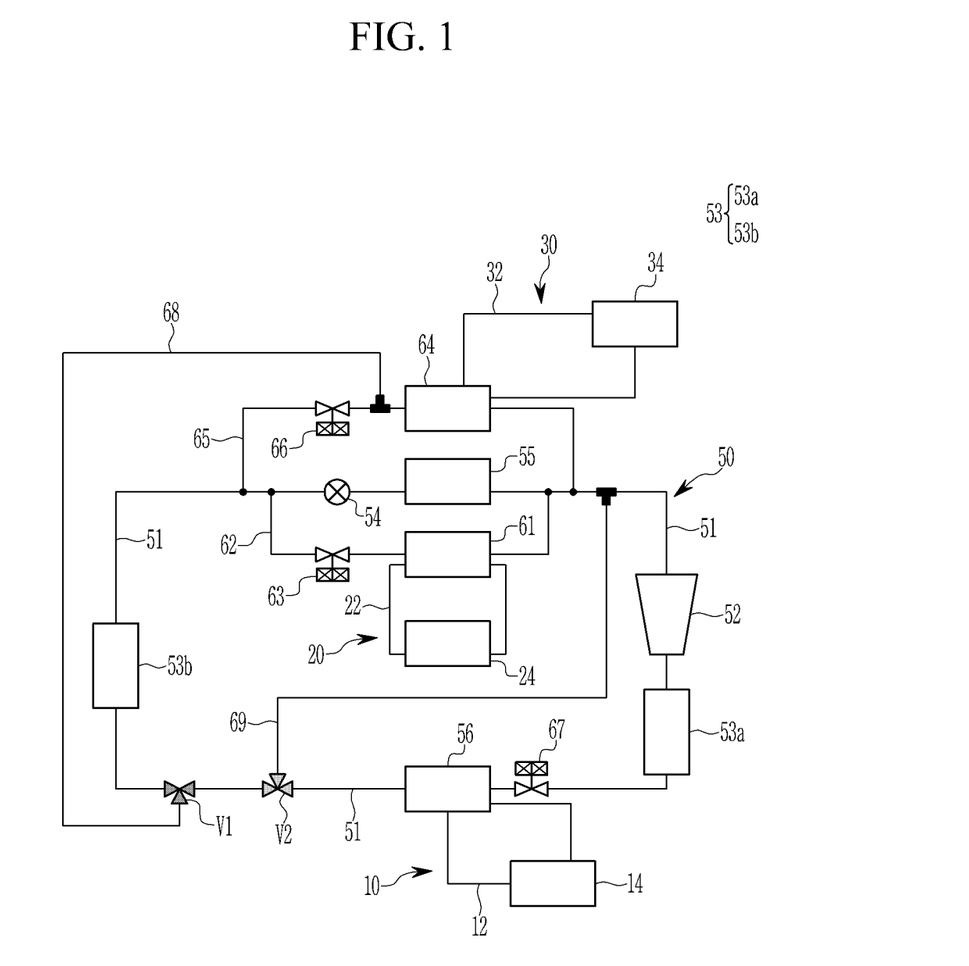
FIG. 1 is a block diagram of a heat pump system for a vehicle according to an embodiment of the present invention.

FIG. 1 is a block diagram of a heat pump system for a vehicle according to an embodiment of the present invention.

Referring to FIG. 1, a heat pump system for a vehicle according to an embodiment of the present invention is applied to a vehicle in which autonomous driving is available.

The vehicle includes a radar, a lidar, a global positioning system (GPS), and various sensors for the autonomous driving, and includes an autonomous driving controller 34 for controlling the equipment.

Also, the vehicle includes a first cooling apparatus 10 cooling at least one electrical component 14, a second cooling apparatus 20 cooling a battery module 24, a third cooling apparatus 30 cooling the autonomous driving controller 34, and an air conditioning device 50 cooling or heating a vehicle interior.

Here, the first cooling apparatus 10, the second cooling apparatus 20, the third cooling apparatus 30, and the air conditioning device 50 may be interconnected.

That is, referring to FIG. 1, in an embodiment of the present invention, the heat pump system includes the first cooling apparatus 10 for cooling the electrical component 14, the second cooling apparatus 20 for cooling the battery module 24, the third cooling apparatus 30 for cooling the autonomous driving controller 34 for the autonomous driving, and the air conditioning device 50.

First, the first cooling apparatus 10 may control the temperature of the electrical component 14 by circulating the first coolant in the first coolant line 12.

The first cooling apparatus 10 may include a non-illustrated radiator, a water pump, and the electrical component 14 that are connected through the first coolant line 12.

The radiator is disposed at the front of the vehicle, a cooling fan is provided at the rear of the radiator, and the coolant is cooled through the operation of the cooling fan and heat-exchange with the outside air.

In addition, the electrical component 14 may include a power control apparatus (electric power control unit, EPCU), a motor, an inverter, or an on board charger (OBC).

This electrical component 14 is provided in the first coolant line 12 and may be cooled by a water cooling type.

The first cooling apparatus 10 configured in this way circulates the first coolant cooled by the radiator through the operation of the water pump along the first coolant line 12, so that the electrical component 14 is cooled to not be overheated.

In addition, when waste heat of the electrical component 14 is recovered in the vehicle's heating mode, heat generated from the power control apparatus, the motor, the inverter, or the on board charger may be recovered.

In the present embodiment, the second cooling apparatus 20 may control the temperature of the battery module 24 by circulating the second coolant in the second coolant line 22.

The second cooling apparatus 20 may include a non-illustrated radiator, a water heater, a water pump, and the battery module 24, which are connected through the second coolant line 22.

Here, the battery module 24 may be cooled by the second coolant circulated in the second coolant line 22 through the operation of the water pump. That is, the battery module 24 is provided in the second coolant line 22.

Accordingly, the battery module 24 may be formed in a water cooling type that supplies power to the electrical component 14 and is cooled with the coolant flowing along the second coolant line 22.

The second cooling apparatus 20 configured in this way circulates the second coolant along the second coolant line 22 through the operation of the water pump so that the battery module 24 is cooled to not be overheated.

In the present embodiment, the third cooling apparatus 30 may control the temperature of the autonomous driving controller 34 by circulating the third coolant in the third coolant line 32.

This third cooling apparatus 30 may include a non-illustrated radiator, a water pump, and the autonomous driving controller 34, which are connected through the third coolant line 32.

Here, the autonomous driving controller 34 may be cooled by the third coolant circulated in the third coolant line 32 through the operation of the water pump. That is, the autonomous driving controller 34 may be provided in the third coolant line 32.

Accordingly, the autonomous driving controller 34 may be formed as a water-cooling type that is cooled with the coolant flowing along the third coolant line 32.

The third cooling apparatus 30 configured in this way circulates the third coolant along the third coolant line 32 through the operation of the water pump, so that the autonomous driving controller 34 is cooled to not be overheated.

Also, the air conditioning device 50 may circulate a refrigerant along the first refrigerant line 51 to control the vehicle's interior temperature.

That is, the air conditioning device 50 may include a compressor 52, a condenser 53, a first expansion valve 54, and an evaporator 55, which are connected through the first refrigerant line 51 to cool or heat the interior of the vehicle by using heat energy generated while the refrigerant is phase-changed.

The compressor 52 compresses the refrigerant, and at least one condenser 53 condenses the refrigerant compressed by the compressor 52.

In the present embodiment, at least one condenser 53 may include an indoor condenser 53a and an outdoor condenser 53b.

The indoor condenser 53a and the outdoor condenser 53b may be air-cooled heat-exchangers that mutually heat-exchange the refrigerant inflowed inside with the outside air.

In the present embodiment, the first expansion valve 54 expands the refrigerant condensed in the indoor condenser 53a and the outdoor condenser 53b. Here, the first expansion valve 54 may be a mechanical expansion valve.

Also, the evaporator 55 may evaporate the expanded refrigerant. The evaporator 55 may be provided inside an HVAC module (heating, ventilation, and air conditioning module, not shown) provided in the vehicle.

In addition, the indoor condenser 53a may be provided inside the HVAC module. The outdoor condenser 53b may be disposed to the front of the vehicle.

Here, the air conditioning device 50 may further include a heat-exchanger 56, a first chiller 61, a second chiller 64, and a connection line 68.

First, the heat-exchanger 56 is connected to the first coolant line 12 and may be provided in the first refrigerant line 51.

This heat-exchanger 56 can heat-exchange the refrigerant supplied through the first refrigerant line 51 and the first coolant supplied through the first coolant line 12 to condense or evaporate the refrigerant.

Here, the heat-exchanger 56 may be disposed on the first refrigerant line 51 between the indoor condenser 53a and the outdoor condenser 53b.

In the present embodiment, the first chiller 61 may be connected to the first refrigerant line 51 through a second refrigerant line 62 and may be connected to the second coolant line 22.

This first chiller 61 may control the temperature of the second coolant by heat-exchanging the selectively inflowed second coolant with the refrigerant supplied through the second refrigerant line 62.

That is, the first chiller 61 may cool the second coolant through the heat-exchange with the refrigerant. The cooled second coolant may be supplied to the battery module 24 through the second coolant line 22.

Here, the first chiller 61 may be coupled in parallel to the first refrigerant line 51 through the second refrigerant line 62.

In the present embodiment, the second chiller 64 may be connected to the first refrigerant line 51 through the third refrigerant line 65 and may be connected to the third coolant line 32.

This second chiller 64 can heat-exchange the selectively inflowed third coolant with the refrigerant supplied through the third refrigerant line 65 to control the temperature of the third coolant.

That is, the second chiller 64 may cool the third coolant through the refrigerant and heat-exchange. The cooled third coolant may be supplied to the autonomous driving controller 34 through the third coolant line 32.

Here, the second chiller 64 may be coupled in parallel to the first refrigerant line 51 through the third refrigerant line 65.

Accordingly, the first chiller 61 and the second chiller 64 may be disposed in parallel with the evaporator 55 through the second refrigerant line 62 and the third refrigerant line 65, respectively.

The second chiller 64 configured in this way may cool the third coolant by heat-exchanging the supplied refrigerant and the third coolant when the cooling of the autonomous driving controller 34 is required in the heating mode of the vehicle interior.

At the same time, the second chiller 64 may recover the waste heat of the autonomous driving controller 34 from the refrigerant that has been heat-exchanged with the third coolant.

Meanwhile, in the present embodiment, a second expansion valve 63 may be provided in the second refrigerant line 62. A third expansion valve 66 may be provided in the third refrigerant line 65.

Also, a fourth expansion valve 67 may be provided in the first refrigerant line 51 between the indoor condenser 53a and the heat-exchanger 56.

Here, the second, third, and fourth expansion valves 63, 66, and 67 may be electronic expansion valves that selectively expand the refrigerant while controlling the flow of the refrigerant.

That is, the second expansion valve 63 may selectively expand the refrigerant supplied to the second refrigerant line 62 to be supplied to the first chiller 61.

Then, the first chiller 61 may heat-exchange the second coolant supplied through the second coolant line 22 and the expanded refrigerant supplied from the second expansion valve 63.

Accordingly, the second coolant of a low temperature, which has completed heat-exchange with the refrigerant in the first chiller 61, flows into the battery module 24 through the second coolant line 22, thereby efficiently cooling the battery module 24.

Meanwhile, the third expansion valve 66 may selectively expand the refrigerant supplied to the third refrigerant line 65 to be supplied to the second chiller 64.

Then, the second chiller 64 may heat-exchange the third coolant supplied through the third coolant line 32 and the expanded refrigerant supplied from the third expansion valve 66.

Accordingly, the third coolant of a low temperature, which has completed heat-exchange with the refrigerant in the second chiller 64, flows into the autonomous driving controller 34 through the third coolant line 32, thereby efficiently cooling the autonomous driving controller 34.

Also, the fourth expansion valve 67 may extend the refrigerant supplied from the indoor condenser 53a through the first refrigerant line 51 in the heating mode of the vehicle interior to be supplied to the heat-exchanger 56.

In this case, the heat-exchanger 56 may evaporate the expanded refrigerant by using the first coolant that flows along the first coolant line 12 and whose temperature has risen while recovering the waste heat of the electrical component 14.

In the present embodiment, one end of the connection line 68 is connected to the first refrigerant line 51 through the first valve V1, and the other end is connected to the third refrigerant line 65 at the front end of the second chiller 64.

This connection line 68 may be opened through the operation of the first valve V1 when the cooling of the autonomous driving controller 34 is required in the heating mode of the vehicle interior.

At this time, the first valve V1 may close the first refrigerant line 51 connected to the outdoor condenser 53b.

Accordingly, the refrigerant that has passed through the heat-exchanger 56 may be inflowed to the third refrigerant line 65 along the connection line 68 opened through the first valve V1.

Meanwhile, in the present embodiment, the air conditioning device 50 may further include a branched line 69.

One end of the branched line 69 may be connected to the second valve V2 provided in the first refrigerant line 51 between the heat-exchanger 56 and the outdoor condenser 53b. Also, the other end of the branched line 69 may be connected to the first refrigerant line 51 between the evaporator 55 and the compressor 52.

The branched line 69 configured in this way may be opened through the operation of the second valve V2 when the cooling of the autonomous driving controller 34 is not required in the heating mode of the vehicle interior.

That is, when the cooling of the autonomous driving controller is not required in the heating mode of the vehicle interior, the second valve V2 may open the branched line 69 and close the first refrigerant line 51 connected to the outdoor condenser 53b.

Meanwhile, in the present embodiment, the air conditioning device 50 is described as an embodiment including the branched line 69, but it is not limited thereto, and the branched line 69 may be removed to reduce the manufacturing cost.

Hereinafter, the operation and the action of the heat pump system according to an embodiment of the present invention as above-configured are described in more detail with reference to FIG. 2 to FIG. 4.

First, an operation for a case in which the cooling of the autonomous driving controller 34 is required during the heating mode of the vehicle in the heat pump system for the vehicle according to an embodiment of the present invention is described with reference to FIG. 2.

Figure 2:
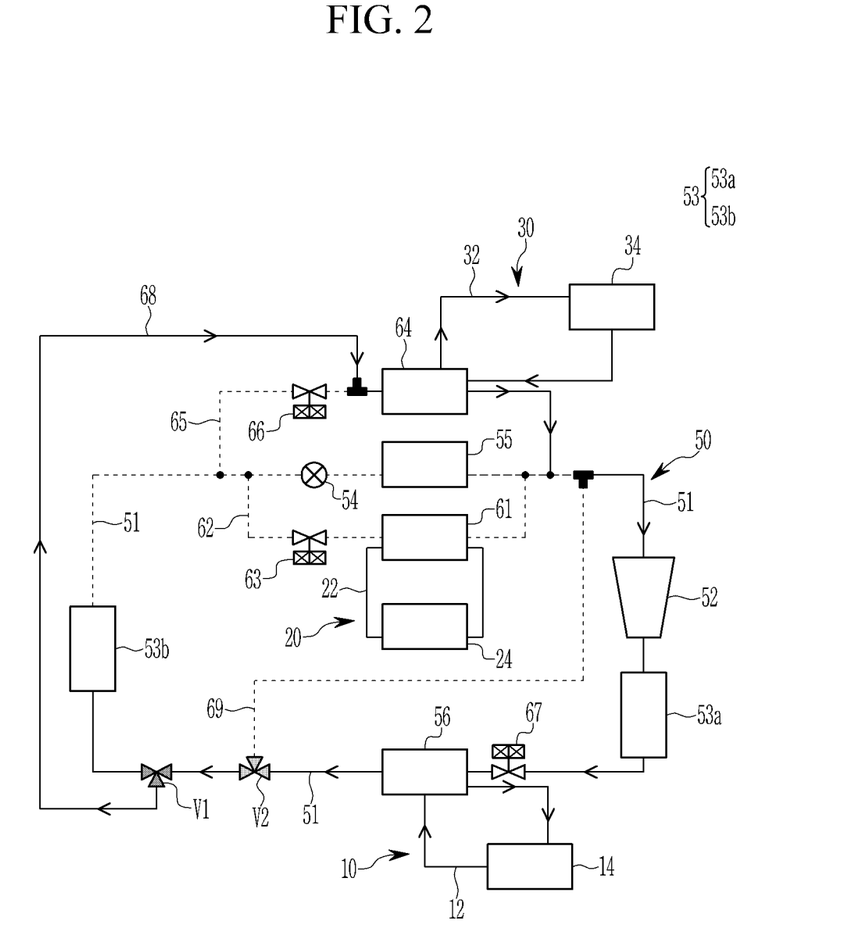
FIG. 2 is an operation state diagram for a case in which cooling of an autonomous driving controller is required during a heating mode of a vehicle interior in a heat pump system for a vehicle according to an embodiment of the present invention.

FIG. 2 is an operation state diagram for a case in which cooling of an autonomous driving controller is required during a heating mode of a vehicle interior in a heat pump system for a vehicle according to an embodiment of the present invention.

Referring to FIG. 2, if the cooling of the autonomous driving controller 34 is required during the heating mode of the vehicle interior, in the first cooling apparatus 10, the first coolant circulates along the first coolant line 12 opened through the operation of the water pump.

Also, in the third cooling apparatus 30, the third coolant circulates along the third coolant line 32 through the operation of the water pump.

Also, in the air conditioning device 50, the refrigerant is circulated along the first refrigerant line 51 by operating each constituent element to heat the vehicle interior.

Here, the connection line 68 is opened by the operation of the first valve V1. Also, the first refrigerant line 51 connected to the outdoor condenser 56b is closed by the operation of the first valve V1.

Also, the branched line 69 is closed by the operation of the second valve V2. Also, the second valve V2 may open the first refrigerant line 51 connected to the first valve V1 so that the refrigerant that has passed through the heat-exchanger 56 is supplied to the connection line 68 through the first valve V1.

Here, the fourth expansion valve 67 may expand the refrigerant inflowed from the indoor condenser 53a to be supplied to the heat-exchanger 56.

At this time, the first cooling apparatus 10 recovers waste heat of the electrical component 14 while cooling the electrical component 14 by using the first coolant. The first coolant whose temperature has increased while cooling the electrical component 14 may be recovered through the heat-exchange with the refrigerant in the heat-exchanger 56.

Accordingly, the heat-exchanger 56 may evaporate the refrigerant by using the first coolant that flows along the first coolant line 12 and whose temperature is increased while recovering the waste heat of the electrical component 14.

That is, the heat-exchanger 56 may recover the waste heat of the electrical component 14 while evaporating the refrigerant inflowed therein to be used for the indoor heating of the vehicle.

Meanwhile, the refrigerant evaporated while passing through the heat-exchanger 56 flows into the second chiller 64 along the connection line 68.

Here, the third cooling apparatus 30 recovers the waste heat of the autonomous driving controller 34 while cooling the autonomous driving controller 34 by using the third coolant. The third coolant, which has increased in temperature while cooling the autonomous driving controller 34, may be recovered in the second chiller 64 through heat-exchange with the refrigerant.

Accordingly, the second chiller 64 may evaporate the refrigerant by using the third coolant that flows along the third coolant line 32 and whose temperature has risen while recovering the waste heat of the autonomous driving controller 34.

That is, the second chiller 64 may recover the waste heat of the autonomous driving controller 34 while evaporating the refrigerant inflowing inside to be used for indoor heating of the vehicle.

Then, the refrigerant that has passed through the second chiller 64 is supplied to the compressor 52 along the first refrigerant line 51 connected to the opened third refrigerant line 65.

The refrigerant compressed from the compressor 52 at high temperature and high pressure is inflowed into the indoor condenser 53a.

Here, an opening/closing door (not shown) provided in the HVAC module (not shown) is opened so that outdoor air passing through the evaporator 55 passes through the indoor condenser 53a.

Accordingly, when passing through the evaporator 55 to which the refrigerant is not supplied, the outdoor air inflowed from the outside is inflowed in the uncooled room temperature state. As the inflowed outdoor air passes through the indoor condenser 53a, it is converted to a high temperature state and inflowed into the vehicle interior, thereby realizing the heating of the vehicle interior.

That is, the heat pump system according to an embodiment of the present invention simultaneously recovers the waste heat of the electrical component 14 and the autonomous driving controller 34 from the heat-exchanger 56 and the second chiller 64 to be used to raise the temperature of the refrigerant, thereby the power consumption of the compressor 52 may be reduced and the heating efficiency may be improved.

Also, the heat pump system may efficiently cool the autonomous driving controller 34 by using the third coolant that is heat-exchanged with the refrigerant supplied from the heat-exchanger 56 to the second chiller 64 through the connection line 68.

The operation of a case in which cooling of an autonomous driving controller is not required during a heating mode of a vehicle in a heat pump system for a vehicle according to an embodiment of the present invention is described with reference to FIG. 3.

Figure 3:
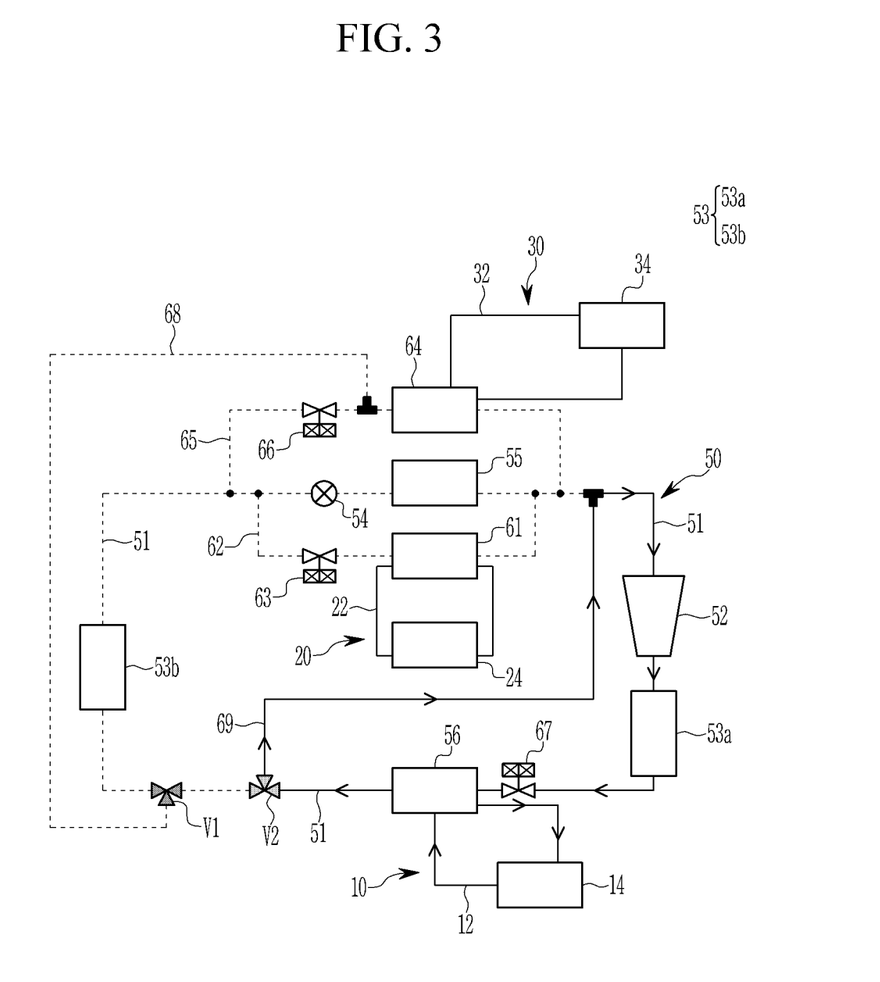
FIG. 3 is an operation state diagram for a case in which cooling of an autonomous driving controller is not required during a heating mode of a vehicle interior in a heat pump system for a vehicle according to an embodiment of the present invention.

FIG. 3 is an operation state diagram for a case in which cooling of an autonomous driving controller is not required during a heating mode of a vehicle interior in a heat pump system for a vehicle according to an embodiment of the present invention.

Referring to FIG. 3, in the case that the cooling of the autonomous driving controller 34 is not required during the heating mode of the vehicle interior, in the first cooling apparatus 10, the first coolant circulates along the first coolant line 12 opened through the operation of the water pump.

Here, the operation of the second cooling apparatus 20 and the third cooling apparatus 30 may be stopped.

Also, in the air conditioning device 50, the refrigerant circulates along the first refrigerant line 51 by operating each constituent element to heat the vehicle interior. Here, the connection line 68 is closed by the operation of the first valve V1.

Also, the branched line 69 is opened by the operation of the second valve V2. Also, the second valve V2 may close a part of the first refrigerant line 51 connected to the first valve V1 so that the refrigerant that has passed through the heat-exchanger 56 is not supplied to the first valve V1 and the outdoor condenser 53b.

Here, the fourth expansion valve 67 may expand the refrigerant inflowed from the indoor condenser 53a to be supplied to the heat-exchanger 56.

At this time, the first cooling apparatus 10 recovers the waste heat of the electrical component 14 while cooling the electrical component 14 by using the first coolant. The first coolant whose temperature has increased while cooling the electrical component 14 may be recovered through the heat-exchange with the refrigerant in the heat-exchanger 56.

Accordingly, the heat-exchanger 56 may evaporate the refrigerant by using the first coolant that flows along the first coolant line 12 and whose temperature is increased while recovering the waste heat of the electrical component 14.

That is, the heat-exchanger 56 may recover the waste heat of the electrical component 14 while evaporating the refrigerant inflowed therein to be used for indoor heating of the vehicle.

Meanwhile, the refrigerant evaporated while passing through the heat-exchanger 56 flows along the open branched line 69. Then, the refrigerant is supplied to the compressor 52 through the first refrigerant line 51 connected to the branched line 69.

The refrigerant compressed from the compressor 52 at high temperature and high pressure is inflowed into the indoor condenser 53a.

Here, an opening/closing door (not shown) provided in the HVAC module (not shown) is opened so that the outdoor air passing through the evaporator 55 passes through the indoor condenser 53a.

Accordingly, when passing through the evaporator 55 to which the refrigerant is not supplied, the outdoor air inflowed from the outside is inflowed to the uncooled room temperature state. As the inflowed outdoor air is converted to a high temperature state while passing through the indoor condenser 53a and inflowed into the vehicle interior, the heating of the vehicle interior may be realized.

That is, the heat pump system according to an embodiment of the present invention recovers the waste heat of the electrical component 14 from the heat-exchanger 56 to be used to increase the temperature of refrigerant, thereby reducing the power consumption of the compressor 52, and improving the heating efficiency.

Therefore, when applying the heat pump system for a vehicle according to an embodiment of the present invention configured as described above, by selectively cooling the autonomous driving controller 34 in the vehicle capable of the autonomous driving even in the heating mode of the vehicle interior, and simultaneously recovering the waste heat of the autonomous driving controller 34, the temperature of the autonomous driving controller 34 may be efficiently controlled and the heating efficiency may be improved.

In addition, embodiments of the present invention do not need to add a separate heat-exchanger for cooling the autonomous driving controller 34 in the vehicle's heating mode, thereby reducing a manufacturing cost.

In addition, embodiments of the present invention may reduce the power consumption and increase the entire travel distance by minimization of the use of a high voltage electric heater in the heating mode of the vehicle.

In addition, embodiments of the present invention may improve the durability and performance of the autonomous driving controller 34 by efficiently cooling the autonomous driving controller 34 even in the heating mode of the vehicle.

Furthermore, embodiments of the present invention may improve the overall marketability of the vehicle and customer satisfaction.

On the other hand, in the heat pump system according to an embodiment of the present invention, it is described that the branched line 69 is provided in the air conditioning device 50 as an embodiment, but it is not limited thereto, and the branched line 69 may not be provided.

That is, when the heating mode of the vehicle interior is operated in the state where the branched line 69 is not provided in the air conditioning device 50, the connection line 68 may always be opened through the operation of the first valve V1.

At this time, the third cooling apparatus 30 may control the temperature of the autonomous driving controller 34 by being selectively operated according to the cooling request of the autonomous driving controller 34.

On the other hand, the heat pump system for the vehicle according to another embodiment of the present invention is described with reference to FIG. 4.

Figure 4:
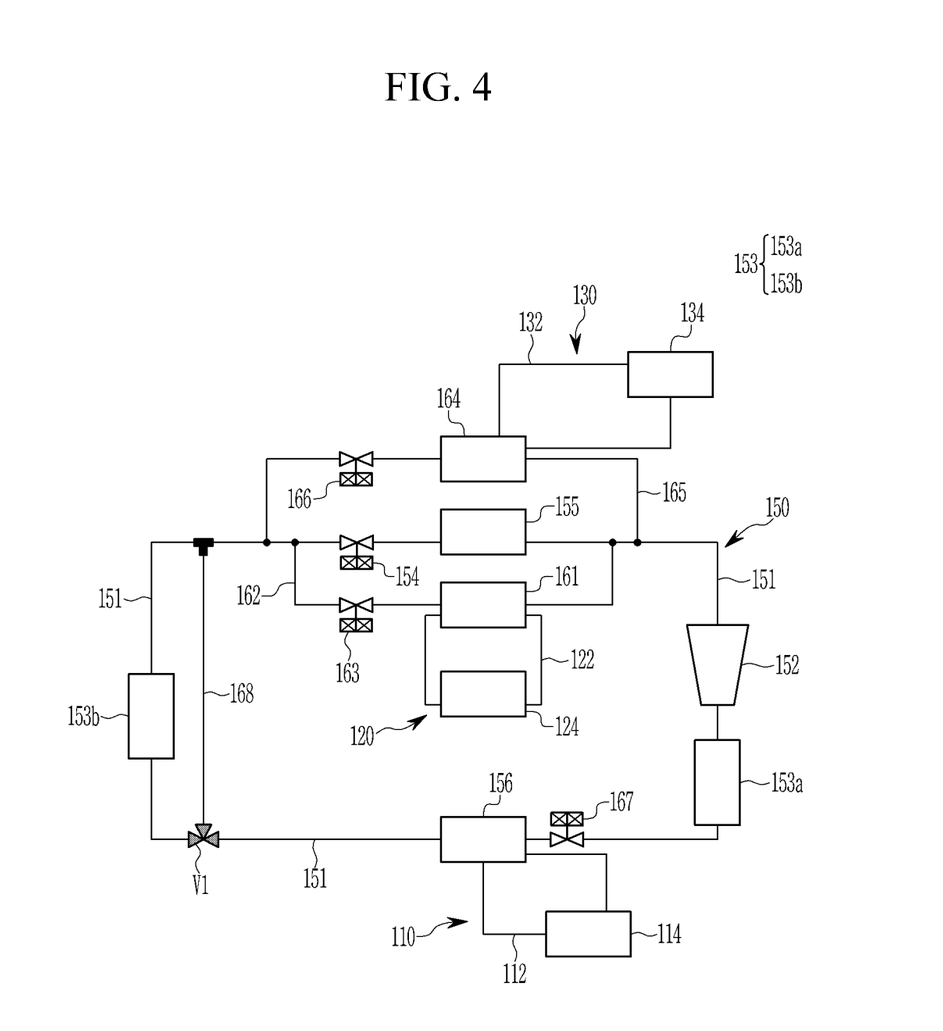
FIG. 4 is a block diagram of a heat pump system for a vehicle according to another embodiment of the present invention.

FIG. 4 is a block diagram of a heat pump system for a vehicle according to another embodiment of the present invention.

Referring to FIG. 4, a heat pump system for a vehicle according to another embodiment of the present invention is applied to a vehicle capable of autonomous driving.

The vehicle includes a radar, a lidar, a global positioning system (GPS), and various sensors for the autonomous driving, and includes an autonomous driving controller 134 for controlling the equipment.

Also, the vehicle includes a first cooling apparatus no cooling at least one electrical component 114, a second cooling apparatus 120 cooling a battery module 124, a third cooling apparatus 130 cooling the autonomous driving controller 134, and an air conditioning device 150 cooling or heating the vehicle interior.

Here, the first cooling apparatus no, the second cooling apparatus 120, the third cooling apparatus 130, and the air conditioning device 150 may be interconnected.

That is, referring to FIG. 4, in an embodiment of the present invention, the heat pump system includes the first cooling apparatus 110 for cooling the electrical component 114, the second cooling apparatus 120 for cooling the battery module 124, the third cooling apparatus 130 for cooling the autonomous driving controller 134 for the autonomous driving, and the air conditioning device iso.

First, the first cooling apparatus no may control the temperature of the electrical component 114 by circulating the first coolant in the first coolant line 112.

The first cooling apparatus no may include a non-illustrated radiator, a water pump, and an electrical component 114, which are connected through the first coolant line 112.

The radiator is disposed at the front of the vehicle, and a cooling fan is provided at the rear of the radiator, and the coolant is cooled through the operation of the cooling fan and the heat-exchange with the outdoor air.

Also, the electrical component 114 may include an electric power control unit (EPCU), a motor, an inverter, or an on board charger (OBC), and the like.

This electrical component 114 is provided in the first coolant line 112 and may be cooled by a water cooling type.

The first cooling apparatus no configured in this way circulates the first coolant cooled by the radiator through the operation of the water pump along the first coolant line 112, so that the electrical component 114 is not overheated.

In addition, when the waste heat of the electrical component 114 is recovered in the heating mode of the vehicle, heat generated from the power control apparatus, the motor, the inverter, or the on board charger may be recovered.

In another embodiment of the present invention, the second cooling apparatus 120 may control the temperature of the battery module 124 by circulating the second coolant in the second coolant line 122.

The second cooling apparatus 120 may include a non-illustrated radiator, a water heater, a water pump, and the battery module 124, which are connected through the second coolant line 122.

Here, the battery module 124 may be cooled by the second coolant circulated in the second coolant line 122 through the operation of the water pump. That is, the battery module 124 is provided in the second coolant line 122.

Accordingly, the battery module 124 may be formed of a water cooling type that supplies power to the electrical component 114 and is cooled with the coolant flowing along the second coolant line 122.

The second cooling apparatus 120 configured in this way circulates the second coolant along the second coolant line 122 through the operation of the water pump, so that the battery module 124 is cooled to not be overheated.

In another embodiment of the present invention, the third cooling apparatus 130 may control the temperature of the autonomous driving controller 134 by circulating the third coolant in the third coolant line 132.

This third cooling apparatus 130 may include a non-illustrated radiator, a water pump, and the autonomous driving controller 134, which are connected through the third coolant line 132.

Here, the autonomous driving controller 134 may be cooled by the third coolant circulated in the third coolant line 132 through the operation of the water pump. That is, the autonomous driving controller 134 may be provided in the third coolant line 132.

Accordingly, the autonomous driving controller 134 may be formed as a water-cooling type that is cooled with the coolant flowing along the third coolant line 132.

The third cooling apparatus 130 configured in this way circulates the third coolant along the third coolant line 132 through the operation of the water pump, so that the autonomous driving controller 134 is cooled to not be overheated.

Also, the air conditioning device 150 may circulate the refrigerant along the first refrigerant line 151 to control the interior temperature of the vehicle.

That is, the air conditioning device 150 may include the compressor 152, the condenser 153, the first expansion valve 154, and the evaporator 155, which are connected through the first refrigerant line 151 so as to cool or heat the interior of the vehicle by using thermal energy generated as the refrigerant is phase-changed.

The compressor 152 compresses the refrigerant, and at least one condenser 153 condenses the refrigerant compressed by the compressor 152.

In another embodiment of the present invention, the at least one condenser 153 may include an indoor condenser 153a and an outdoor condenser 153b.

The indoor condenser 153a and the outdoor condenser 153b may be air-cooled heat-exchangers that mutually heat-exchange the refrigerant inflowed to the interior with the outdoor air.

In the present embodiment, the first expansion valve 154 expands the refrigerant condensed in the indoor condenser 153a and the outdoor condenser 153b. Here, the first expansion valve 54 may be an electronic expansion valve that selectively expands the refrigerant while controlling the flow of the refrigerant.

Also, the evaporator 155 may evaporate the expanded refrigerant. The evaporator 155 may be provided inside the HVAC module (not shown) provided in the vehicle.

In addition, the indoor condenser 153a may be provided inside the HVAC module. The outdoor condenser 153b can be disposed to the front of the vehicle.

Here, the air conditioning device 150 may further include a heat-exchanger 156, a first chiller 161, a second chiller 164, and a connection line 168.

First, the heat-exchanger 156 is connected to the first coolant line 112, and may be provided in the first refrigerant line 151.

This heat-exchanger 156 heat-exchanges the refrigerant supplied through the first refrigerant line 151 and the first coolant supplied through the first coolant line 112 to condense or evaporate the refrigerant.

Here, the heat-exchanger 156 may be disposed on the first refrigerant line 151 between the indoor condenser 153a and the outdoor condenser 153b.

In another embodiment of the present invention, the first chiller 161 may be connected to the first refrigerant line 151 through the second refrigerant line 162 and may be connected to the second coolant line 122.

This first chiller 161 may control the temperature of the second coolant by heat-exchanging the selectively inflowed second coolant with the refrigerant supplied through the second refrigerant line 162.

That is, the first chiller 161 may cool the second coolant through the heat-exchange with the refrigerant. The cooled second coolant may be supplied to the battery module 124 through the second coolant line 122.

Here, the first chiller 161 may be coupled in parallel to the first refrigerant line 151 through the second refrigerant line 162.

In another embodiment of the present invention, the second chiller 164 may be connected to the first refrigerant line 151 through the third refrigerant line 165 and may be connected to the third coolant line 132.

The second chiller 164 can heat-exchange the selectively inflowed third coolant with the refrigerant supplied through the third refrigerant line 165 to control the temperature of the third coolant.

That is, the second chiller 164 may cool the third coolant through the heat-exchange with the refrigerant. The cooled third coolant may be supplied to the autonomous driving controller 134 through the third coolant line 132.

Here, the second chiller 164 may be coupled in parallel to the first refrigerant line 151 through the third refrigerant line 165.

Accordingly, the first chiller 161 and the second chiller 164 may be disposed in parallel with the evaporator 155 through the second refrigerant line 162 and the third refrigerant line 165, respectively.

The second chiller 164 configured in this way may cool the third coolant by heat-exchanging the supplied refrigerant and the third coolant when the cooling of the autonomous driving controller 134 is required in the heating mode of the vehicle interior.

At the same time, the second chiller 164 may recover the waste heat of the autonomous driving controller 134 from the refrigerant heat-exchanged with the third coolant.

On the other hand, in another embodiment of the present invention, the second refrigerant line 162 may be provided with the second expansion valve 163. The third refrigerant line 165 may be equipped with a third expansion valve 166.

Also, between the indoor condenser 153a and the heat-exchanger 156, the first refrigerant line 151 may be provided with a fourth expansion valve 167.

Here, the second, third, and fourth expansion valves 163, 166, and 167 may be electronic expansion valves that selectively expand the refrigerant while controlling the flow of the refrigerant.

That is, the second expansion valve 163 may selectively expand the refrigerant supplied to the second refrigerant line 162 to be supplied to the first chiller 161.

Then, the first chiller 161 may heat-exchange the second coolant supplied through the second coolant line 122 and the expanded refrigerant supplied from the second expansion valve 163.

Accordingly, the second coolant of a low temperature, which has completed heat-exchange with the refrigerant in the first chiller 161, flows into the battery module 124 through the second coolant line 122, thereby efficiently cooling the battery module 124.

Meanwhile, the third expansion valve 166 may selectively expand the refrigerant supplied to the third refrigerant line 165 to be supplied to the second chiller 164.

Then, the second chiller 164 may heat-exchange the third coolant supplied through the third coolant line 132 and the expanded refrigerant supplied from the third expansion valve 166.

Accordingly, the third coolant of a low temperature, which has completed heat-exchange with the refrigerant in the second chiller 164, flows into the autonomous driving controller 134 through the third coolant line 132, thereby efficiently cooling the autonomous driving controller 134.

Also, the fourth expansion valve 167 may expand the refrigerant supplied from the indoor condenser 153a through the first refrigerant line 151 in the heating mode of the vehicle interior to be supplied to the heat-exchanger 156.

In this case, the heat-exchanger 156 may evaporate the expanded refrigerant by using the first coolant that flows along the first coolant line 112 and whose temperature has risen while recovering the waste heat of the electrical component 114.

In another embodiment of the present invention, one end of the connection line 168 is connected to the first refrigerant line 151 through the first valve V1. The other end of the connection line 168 is connected to the first refrigerant line 151 at the rear end of the outdoor condenser 153b.

That is, the other end of the connection line 168 may be connected to the first refrigerant line 151 connecting the rear end of the outdoor condenser 153b and one end of the third refrigerant line 165.

This connection line 168 may be opened through the operation of the first valve V1 in the heating mode of the vehicle interior.

At this time, the first valve V1 may close the first refrigerant line 51 connected to the outdoor condenser 153b.

Accordingly, the refrigerant that has passed through the heat-exchanger 156 may flow without passing through the outdoor condenser 153b along the connection line 168 opened through the first valve V1.

Also, the refrigerant flowing along the connection line 168 may inflow to the first refrigerant line 151, the second refrigerant line 162, or the third refrigerant line 165 according to the optional operation of the first, second, and third expansion valves 154, 163, and 166, respectively.

Here, the first, second, and third expansion valves 154, 163, and 166 may flow the refrigerant without the expansion.

Next, the operation and action of the heat pump system according to another embodiment of the present invention as above-described will be described in detail with reference to FIG. 5.

Figure 5:
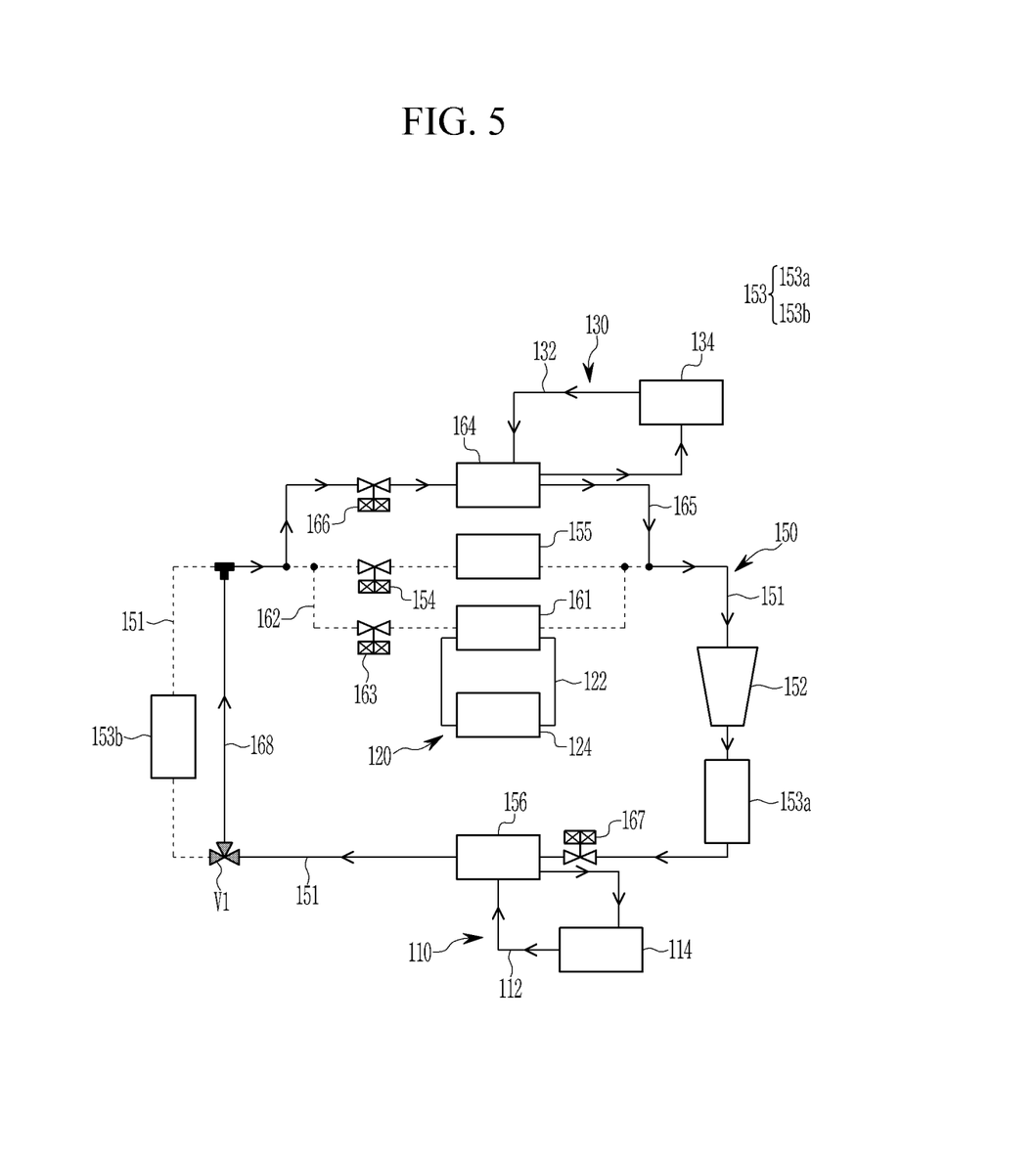
FIG. 5 is an operation state diagram for a case in which cooling of an autonomous driving controller is required during a heating mode of a vehicle interior in a heat pump system for a vehicle according to an embodiment of the present invention.

FIG. 5 is an operation state diagram for a case in which cooling of an autonomous driving controller is required during a heating mode of a vehicle interior in a heat pump system for a vehicle according to an embodiment of the present invention.

Referring to FIG. 5, in the heat pump system according to another embodiment of the present invention, if the heating mode of the vehicle interior is operated, in the first cooling apparatus 110, the first coolant circulates along the first coolant line 112 opened through the operation of the water pump.

Also, the air conditioning device 150 circulates the refrigerant along the first refrigerant line 151 by operating each constituent element to heat the vehicle interior.

The connection line 168 is opened by the operation of the first valve V1. In addition, the first refrigerant line 151 connected to the outdoor condenser 156b is closed by the operation of the first valve V1.

Here, the fourth expansion valve 167 may expand the refrigerant inflowed from the indoor condenser 53a to be supplied to the heat-exchanger 156.

At this time, the first cooling apparatus 110 recovers waste heat of the electrical component 114 while cooling the electrical component 114 by using the first coolant. The first coolant, which has increased in temperature while cooling the electrical component 114, may be recovered through heat-exchange with the refrigerant in the heat-exchanger 156.

Accordingly, the heat-exchanger 156 evaporates the refrigerant by using the first coolant that flows along the first coolant line 112 and whose temperature is increased while recovering waste heat of the electrical component 114.

That is, the heat-exchanger 156 may be used for indoor heating of the vehicle by recovering the waste heat of the electrical component 114 while evaporating the refrigerant inflowed to the inside.

Meanwhile, the refrigerant evaporated while passing through the heat-exchanger 156 flows along the connection line 168 without passing through the outdoor condenser 153b.

At this time, the operation of the first expansion valve 154 is stopped, and the second expansion valve 163 and the third expansion valve 166 may be operated selectively when the cooling of the battery module 124 and the autonomous driving controller 134 is required, or the refrigerant is supplied to the compressor 152.

That is, the second expansion valve 163 opens the second refrigerant line 162 when the cooling of the battery module 124 is required. At this time, the second cooling apparatus 120 may circulate the second coolant to the second coolant line 122 through the operation of the water pump.

Also, the third expansion valve 166 may open the third refrigerant line 165 when the cooling of the autonomous driving controller 134 is required.

On the other hand, when the refrigerant is supplied to the compressor 152, both the second expansion valve 163 and the third expansion valve 166 may be operated, or at least one may be operated.

On the other hand, when the cooling of the autonomous driving controller 134 is required in the heating mode of the vehicle interior, the third refrigerant line 165 is opened by the operation of the third expansion valve 166.

Then, the refrigerant inflowed through the connection line 168 may inflow into the third refrigerant line 165 and pass through the second chiller 164.

Here, the third cooling apparatus 130 recovers waste heat of the autonomous driving controller 134 while cooling the autonomous driving controller 134 using the third coolant. The third coolant, which has increased in temperature while cooling the autonomous driving controller 134, may be recovered through heat-exchange with the refrigerant in the second chiller 164.

Accordingly, the second chiller 164 may evaporate the refrigerant by using the third coolant that flows along the third coolant line 132 and whose temperature has risen while recovering waste heat of the autonomous driving controller 134.

That is, the second chiller 164 may recover the waste heat of the autonomous driving controller 134 while evaporating the refrigerant inflowed inside to be used for the indoor heating of the vehicle.

Then, the refrigerant that has passed through the second chiller 164 is supplied to the compressor 152 along the first refrigerant line 151 connected to the opened third refrigerant line 165.

The refrigerant compressed from the compressor 152 at high temperature and high pressure is inflowed to the indoor condenser 153a.

Here, the opening/closing door (not shown) provided in the HVAC module (not shown) is opened so that the outdoor air passing through the evaporator 155 passes through the indoor condenser 153a.

Accordingly, when the outdoor air inflowed from the outside passes through the evaporator 155 to which the refrigerant is not supplied, it is inflowed in the uncooled room temperature state. As the inflowed outdoor air is converted to a high temperature state while passing through the indoor condenser 153a and inflowed into the vehicle interior, the heating of the vehicle interior may be realized.

That is, the heat pump system according to an embodiment of the present invention simultaneously recovers the waste heat of the electrical component 114 and the autonomous driving controller 134 from the heat-exchanger 156 and the second chiller 164 to be used to increase the refrigerant's temperature, thereby the power consumption of the compressor 152 may be reduced and the heating efficiency may be improved.

In addition, the heat pump system may efficiently cool the autonomous driving controller 134 by using the third coolant heat-exchanged with the refrigerant supplied from the heat-exchanger 156 to the second chiller 164 through the connection line 168.

Therefore, when applying the heat pump system for a vehicle according to an embodiment of the present invention configured as described above, by selectively cooling the autonomous driving controller 134 in the vehicle capable of the autonomous driving even in the heating mode of the vehicle interior, and simultaneously recovering the waste heat of the autonomous driving controller 134, the temperature of the autonomous driving controller 134 may be efficiently controlled and the heating efficiency may be improved.

In addition, embodiments of the present invention do not need to add a separate heat-exchanger for cooling the autonomous driving controller 134 in the vehicle's heating mode, thereby reducing a manufacturing cost.

In addition, embodiments of the present invention may reduce the power consumption and increase the entire travel distance by minimization of the use of a high voltage electric heater in the heating mode of the vehicle.

In addition, embodiments of the present invention may improve the durability and performance of the autonomous driving controller 134 by efficiently cooling the autonomous driving controller 134 even in the heating mode of the vehicle.

Furthermore, embodiments the present invention may improve the overall marketability of the vehicle and customer satisfaction.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A heat pump system for a vehicle, the heat pump system comprising:
   a first cooling apparatus configured to circulate a first coolant in a first coolant line to control a temperature of an electrical component;
   a second cooling apparatus configured to circulate a second coolant in a second coolant line to control a temperature of a battery module;
   a third cooling apparatus configured to circulate a third coolant in a third coolant line to control a temperature of an autonomous driving controller; and
   an air conditioning device configured to circulate a refrigerant along a first refrigerant line to control an indoor temperature of the vehicle, the air conditioning device comprising
   a compressor;
   a condenser;
   a first expansion valve;
   an evaporator, the compressor, the condenser, the first expansion valve, and the evaporator being connected through the first refrigerant line;
   a first chiller connected to the first refrigerant line through a second refrigerant line, connected to the second coolant line, and configured to heat-exchange the second coolant selectively inflowed with the refrigerant supplied through the second refrigerant line to control a temperature of the second coolant;
   a second chiller connected to the first refrigerant line through a third refrigerant line, connected to the third coolant line, and configured to heat-exchange the third coolant selectively inflowed with the refrigerant supplied through the third refrigerant line to control a temperature of the third coolant; and a connection line having a first end connected to the first refrigerant line through the first valve and a second end connected to the third refrigerant line at a front end of the second chiller.

2. The heat pump system of claim 1, wherein the connection line is configured to be opened through an operation of the first valve when cooling of the autonomous driving controller is required in a heating mode of a vehicle interior.

3. The heat pump system of claim 1, wherein:
the first chiller is coupled in parallel to the first refrigerant line through the second refrigerant line;
the second chiller is coupled in parallel to the first refrigerant line through the third refrigerant line; and
the first chiller and the second chiller are disposed in parallel with the evaporator through the second refrigerant line and the third refrigerant line, respectively.

4. The heat pump system of claim 1, wherein:
the electrical component is provided on the first coolant line;
the battery module is provided on the second coolant line; and
the autonomous driving controller is provided on the third coolant line.

5. The heat pump system for the vehicle of claim 1, wherein, when cooling of the autonomous driving controller is required in a heating mode of a vehicle interior, the second chiller is configured to heat-exchange the supplied refrigerant and the third coolant to cool the third coolant and simultaneously recover waste heat of the autonomous driving controller from the refrigerant heat-exchanged with the third coolant.

6. A heat pump system for a vehicle, the heat pump system comprising:
a first cooling apparatus configured to circulate a first coolant in a first coolant line to control a temperature of an electrical component;
a second cooling apparatus configured to circulate a second coolant in a second coolant line to control a temperature of a battery module;
a third cooling apparatus configured to circulate a third coolant in a third coolant line to control a temperature of an autonomous driving controller; and
an air conditioning device configured to circulate a refrigerant along a first refrigerant line to control an indoor temperature of the vehicle, the air conditioning device comprising
a compressor;
a condenser;
a first expansion valve;
an evaporator, the compressor, the condenser, the first expansion valve, and the evaporator being connected through the first refrigerant line;
a first chiller connected to the first refrigerant line through a second refrigerant line, connected to the second coolant line, and configured to heat-exchange the second coolant selectively inflowed with the refrigerant supplied through the second refrigerant line to control a temperature of the second coolant;
a second chiller connected to the first refrigerant line through a third refrigerant line, connected to the third coolant line, and configured to heat-exchange the third coolant selectively inflowed with the refrigerant supplied through the third refrigerant line to control a temperature of the third coolant;

a connection line having a first end connected to the first refrigerant line through the first valve and a second end connected to the third refrigerant line at a front end of the second chiller; and
a heat-exchanger connected to the first coolant line, the heat-exchanger being configured to heat-exchange the refrigerant supplied through the first refrigerant line and the first coolant supplied through the first coolant line to condense or evaporate the refrigerant.

7. The heat pump system of claim 6, wherein:
the condenser comprises an indoor condenser and an outdoor condenser; and
the heat-exchanger is provided on the first refrigerant line between the indoor condenser and the outdoor condenser.

8. The heat pump system of claim 7, wherein the air conditioning device further comprises a branched line having a first end connected to a second valve provided on the first refrigerant line between the heat-exchanger and the outdoor condenser and a second end connected to the first refrigerant line between the evaporator and the compressor.

9. The heat pump system of claim 8, wherein, when cooling of the autonomous driving controller is not required in a heating mode of a vehicle interior, the second valve is configured to open the branched line and close the first refrigerant line connected to the outdoor condenser.

10. The heat pump system of claim 8, wherein, when cooling of the autonomous driving controller is required in a heating mode of a vehicle interior, the first valve is configured to open the connection line and close the first refrigerant line connected to the outdoor condenser, and the second valve is configured to close the branched line and open the first refrigerant line connected to the first valve.

11. The heat pump system of claim 7, wherein:
a second expansion valve is provided on the second refrigerant line;
a third expansion valve is provided on the third refrigerant line; and
a fourth expansion valve is provided between the indoor condenser and the heat-exchanger.

12. The heat pump system of claim 11, wherein the fourth expansion valve is configured to expand the refrigerant supplied from the indoor condenser to the heat-exchanger through the first refrigerant line in a heating mode of a vehicle interior.

13. The heat pump system of claim 11, wherein the second expansion valve, the third expansion valve, and the fourth expansion valve comprise electronic expansion valves configured to selectively expand the refrigerant while controlling a flow of the refrigerant.

14. A vehicle comprising:
an electrical component provided on a first coolant line;
a battery module provided on a second coolant line;
an autonomous driving controller provided on a third coolant line;
a first cooling apparatus configured to circulate a first coolant in the first coolant line to control a temperature of the electrical component;
a second cooling apparatus configured to circulate a second coolant in the second coolant line to control a temperature of the battery module;
a third cooling apparatus configured to circulate a third coolant in the third coolant line to control a temperature of the autonomous driving controller; and an air conditioning device configured to circulate a refrigerant along a first refrigerant line to control an indoor temperature of the vehicle, the air conditioning device comprising
- a compressor, an indoor condenser, an outdoor condenser, a first expansion valve, and an evaporator connected through the first refrigerant line;
- a first chiller connected to the first refrigerant line through a second refrigerant line, connected to the second coolant line, and configured to heat-exchange the second coolant selectively inflowed with the refrigerant supplied through the second refrigerant line to control a temperature of the second coolant;
- a second chiller connected to the first refrigerant line through a third refrigerant line, connected to the third coolant line, and configured to heat-exchange the third coolant selectively inflowed with the refrigerant supplied through the third refrigerant line to control a temperature of the third coolant;
- a connection line having a first end connected to the first refrigerant line through the first valve and a second end connected to the third refrigerant line at a front end of the second chiller; and
- a heat-exchanger connected to the first coolant line, the heat-exchanger being configured to heat-exchange the refrigerant supplied through the first refrigerant line and the first coolant supplied through the first coolant line to condense or evaporate the refrigerant.

15. The vehicle of claim 14, wherein the heat-exchanger is provided on the first refrigerant line between the indoor condenser and the outdoor condenser.

16. The vehicle of claim 15, wherein the air conditioning device further comprises a branched line having a first end connected to a second valve provided on the first refrigerant line between the heat-exchanger and the outdoor condenser and a second end connected to the first refrigerant line between the evaporator and the compressor.

17. The vehicle of claim 16, wherein, when cooling of the autonomous driving controller is not required in a heating mode of a vehicle interior, the second valve is configured to open the branched line and close the first refrigerant line connected to the outdoor condenser.

18. The vehicle of claim 16, wherein, when cooling of the autonomous driving controller is required in a heating mode of a vehicle interior, the first valve is configured to open the connection line and close the first refrigerant line connected to the outdoor condenser, and the second valve is configured to close the branched line and open the first refrigerant line connected to the first valve.

19. The vehicle of claim 15, wherein:
- a second expansion valve is provided on the second refrigerant line;
- a third expansion valve is provided on the third refrigerant line; and
- a fourth expansion valve is provided between the indoor condenser and the heat-exchanger.

20. The vehicle of claim 19, wherein the second expansion valve, the third expansion valve, and the fourth expansion valve comprise electronic expansion valves configured to selectively expand the refrigerant while controlling a flow of the refrigerant.

* * * * *